United States Patent [19]

Morrison et al.

[11] 4,201,096

[45] May 6, 1980

[54] SPRING LOCK KNOB ASSEMBLY

[75] Inventors: Raymond C. Morrison, Scituate; Albert R. Pratt, Weston, both of Mass.

[73] Assignee: Raytheon Company, Lexington, Mass.

[21] Appl. No.: 861,915

[22] Filed: Dec. 19, 1977

[51] Int. Cl.[2] .......................... G05G 5/16; G05G 1/10; F16D 13/14

[52] U.S. Cl. ......................................... 74/531; 74/553; 74/554; 74/504; 188/166; 192/95; 192/76

[58] Field of Search ................. 74/531, 553, 554, 504; 192/95, 8 C, 8 R, 81 C, 76, 101; 188/82.6, 166, 78; 16/121

[56] References Cited

U.S. PATENT DOCUMENTS

| | | | |
|---|---|---|---|
| 1,159,717 | 11/1915 | Scott | 192/101 |
| 3,774,571 | 11/1973 | Shimanckas | 74/531 |
| 3,837,441 | 9/1974 | Uno et al. | 188/82.6 |
| 4,012,966 | 5/1977 | Lieberman et al. | 74/531 |
| 4,036,079 | 7/1977 | Pratt | 74/531 |

*Primary Examiner*—Benjamin Wyche
*Assistant Examiner*—David C. Reichard
*Attorney, Agent, or Firm*—John T. Meaney; Joseph D. Pannone

[57] ABSTRACT

A knob assembly comprising a cup-shaped knob shell having therein a coaxial pair of oppositely wound coil springs disposed for binding engagement with a surrounding wall of a race and having respective terminal end portions engaging an encircled portion of an axially rotatable bushing which is provided with fastening means for rotatably engaging an axially inserted shaft, the springs having other terminal end portions engaged by respective oppositely rotatable lever arms mounted on the bushing and having end portions aligned with axially spaced projections of the knob shell, whereby axial movement of the shell causes the projections to pivot the lever arms in opposite angular directions to release the coil springs windingly from binding engagement with the wall of the race and permit rotation of the bushing and engaged shaft in response to rotary movement of the knob shell.

8 Claims, 4 Drawing Figures

SPRING LOCK KNOB ASSEMBLY

BACKGROUND OF THE INVENTION

1. Field of the Invention

This invention relates generally to adjustment knobs and is concerned more particularly with a knob assembly having means for controllablyy locking a rotatable shaft in a selected angular position.

2. Discussion of the Prior Art

Control devices, such as valves, timers, rheostats, potentiometers, and the like, generally are provided with a protruding shaft which may be rotated to adjust the device to a desired setting. A coaxially disposed knob may be affixed to a distal end portion of the shaft such that rotation of the knob will produce a corresponding rotation of the shaft. Also, for critically adjusted devices, for example, the knob assembly may include suitable locking means for maintaining the rotatable shaft in a selected angular position until a new adjustment is required.

Thus, U.S. Pat. No. 2,787,353 granted to L. Spraragen discloses a push-to-turn knob assembly having resiliently biased locking means interacting with a plurality of coaxial cylinders for maintaining an axially disposed shaft in a selected angular position. However, locking means of the described type generally involves a plurality of parts having tight dimensional tolerances to avoid undesired interference engagements which may cause malfunction of the knob assembly. Furthermore, these prior art knob assemblies generally are expensive to fabricate and require time consuming operations for assembling the plurality of interacting parts into a relatively complicated structure.

Therefore, it is advantageous and desirable to provide a control knob assembly with comparatively inexpensive and readily assembled means for controllably locking a rotatable shaft in a selected angular position.

SUMMARY OF THE INVENTION

Accordingly, this invention provides a control knob assembly having windingly operable spring means for releasably locking a rotatable shaft in a selected angular position. The knob assembly includes a cup-shaped knob shell supported for rotation about an annular race which encircles an axially rotatable bushing. The bushing is provided with fastening means for rotatably attaching the bushing to an axially inserted end portion of a rotatable shaft, and has an end portion disposed adjacent the closed end of the shell. The knob shell and the bushing are provided with respective interlocking means for rotatably connecting the shell to the bushing and the attached shaft.

A releasable locking means including a pair of windingly operable spring members is disposed in the race for bindingly locking the bushing to the race and preventing undesired rotation of the attached shaft. A releasing means including an inwardly projecting portion of the knob shell is resiliently positioned with respect to the spring members for disengaging the locking means and permitting rotation of the shaft while an axially directed force is applied to the knob shell. Consequently, simultaneous rotation of the knob shell is transmitted through the interlocking means to produce corresponding rotation of the bushing and attached shaft. When the axially directed force is removed from the knob shell, and releasing means is resiliently returned to its initial position and the locking means bindingly locks the bushing to the race to prevent rotation of the attached shaft from the selected angular position.

A preferred embodiment of the invention comprises a control knob assembly including a cup-shaped knob shell rotatable about an outer cylindrical wall of an annular race which is axially disposed in the open end portion of the shell. The race is provided with means for nonrotatably engaging a fixed support member, and encircles a rotatable bushing which extends axially within the shell. The bushing is provided with radially journaled, fastening means for bindingly engaging an axially inserted end portion of a rotatable shaft, and has an axially slotted end portion disposed adjacent the closed end of the knob shell. A resilient means is disposed in axially compressible engagement with the knob shell for positioning a plurality of keys extending from the closed end portion of the shell in entrance portions of respectively aligned slots in the bushing. Thus, the partly engaged keys are maintained in alignment with the respective slots and permit the knob shell to be moved axially against the pressure of the resilient spacing means to bring the keys fully into engagement with the slots. Accordingly, the keys and slots constitute respective interlocking means for rotatably connecting the knob shell to the bushing and engaged shaft.

A releasable locking means is arcuately disposed in the race and includes an axially aligned pair of oppositely wound, coil springs having terminal end portions engaged in respective diametrically spaced slots in the bushing. Each of the coil springs has outer peripheral surface portions engaging the outer cylindrical wall of the race, such that an attempt to rotate the bushing in either angular direction causes one of the springs to open and lock the engaged shaft in the selected angular position. The coil springs have other terminal end portions engaged in respective opposite pivotal arms which are rotatably mounted on the bushing. The arms have respective angled end portions extending transversely of the bushing, in respective opposite directions, and are aligned with a shoulder projecting inwardly of the knob shell. The shoulder is positioned with respect to the angled end portions of the arms by the resilient spacing means which positions the keys in the entrance portions of the slots for rotatably connecting the knob shell to the bushing and engaged shaft.

Accordingly, an axial pressure on the knob shell not only brings the keys into full engagement with the slots but also brings the shoulder of the knob shell into pressure engagement with the angled end portions of the pivotal arms. As a result, the arms are rotated in opposite angular directions to disengage the coil springs windingly from the outer cylindrical wall of the nonrotatable race. Thus, the bushing and engaged shaft no longer are bindingly locked to the race, and simultaneous rotation of the knob shell produces a corresponding rotation of the bushing and engaged shaft. When the axial pressure is removed from the knob shell, the resilient spacing means functions to reposition the keys in the entrance portions of the slots, and to move the shoulder of knob out of pressure engagement with the angled end portions of the oppositely rotatable arms. Consequently, the resilient properties of the oppositely wound coil springs function to return the arms to their initial angular positions, and to bring outer peripheral surface portions of the coil springs into binding engagement with the outer cylindrical wall of the race. Thus, the bushing and engaged shaft are locked to the race to prevent undesired rotation of the shaft from the newly selected angular position.

BRIEF DESCRIPTION OF THE DRAWINGS

For a better understanding of the invention, reference is made in the following detailed description to the drawings wherein.

DESCRIPTION OF THE PREFERRED EMBODIMENT

Figure 1:
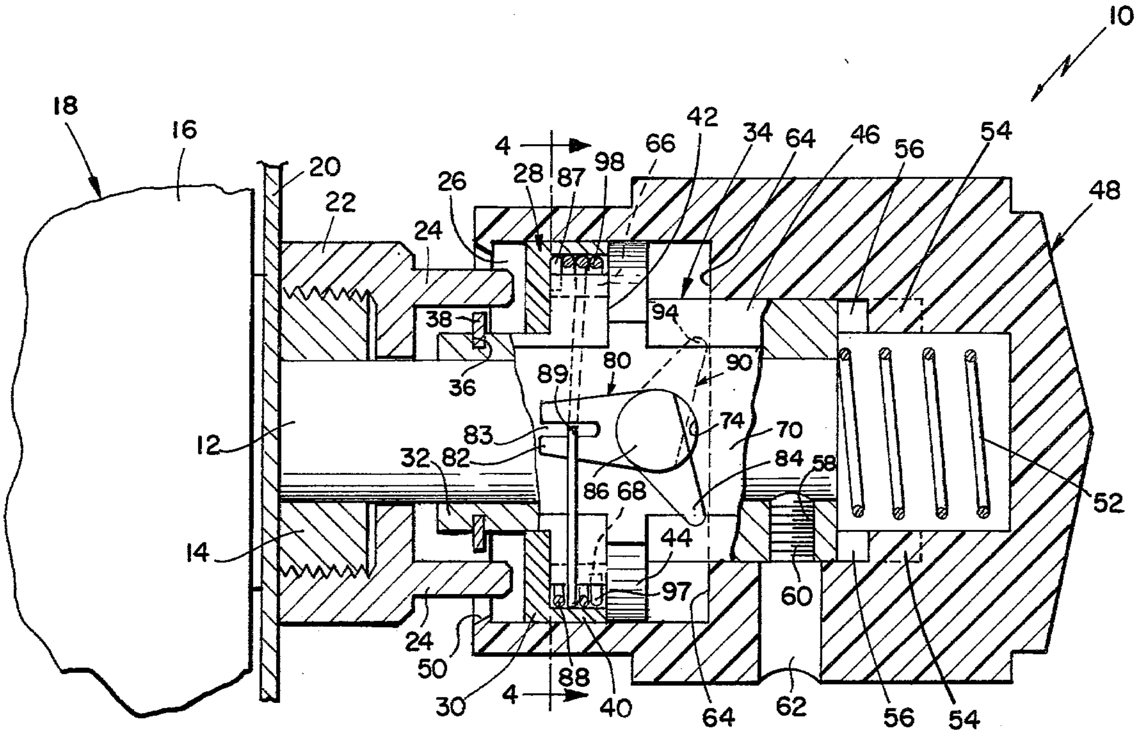
FIG. 1 is an axial view, partly in section, of a control knob assembly embodying the invention and shown in the locked operating condition.
Figures 3, 4:
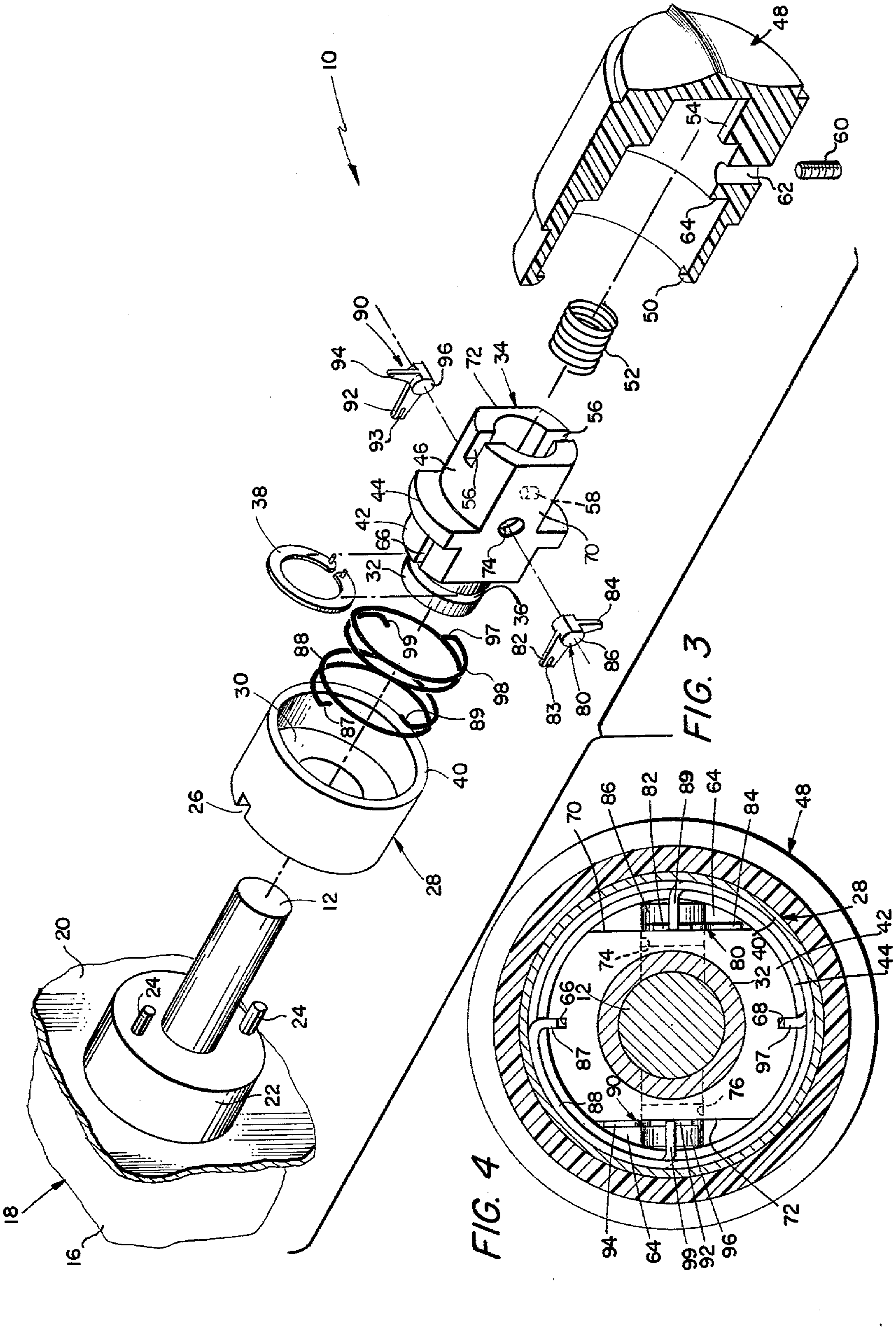
FIG. 3 is an exploded view of the control knob assembly shown in FIGS. 1 and 2.
FIG. 4 is a transverse sectional view taken along the line 4—4 in FIG. 1 and looking in the direction of the arrows.

Referring to the drawing wherein like characters of reference designate like parts, there is shown in FIGS. 1 and 3, a push-to-turn knob assembly 10 mounted on a distal end portion of a rotatable shaft 12. The shaft 12 may extend axially through a threaded collar 14 and into an attached housing 16 of a control device 18, such as a potentiometer, for example. Thus, rotation of shaft 12 about its axial centerline produces a corresponding movement of a control element (not shown), such as a potentiometer wiper arm in housing 16, for example, thereby adjusting the control device 18 to a desired setting. The device 18 may be mounted on a control panel 20 by passing the shaft 12 and collar 14 axially through a suitably configured aperture (not shown) in the panel and threading a nut 22 onto collar 14. Accordingly, one surface of the nut 22 is brought into binding engagement with the abutting surface of panel 20 to secure the housing 16 thereto in a conventional non-rotatable manner.

A pair of rigid fingers 24 extend outwardly from the opposing surface of nut 22 and into aligned portions of a slot 26 which is diametrically disposed in an exterior end surface of an annular race 28. Race 28 is supported in a non-rotatable manner by the fingers 24, and includes an annular wall 30 comprising the closed end of the race. Extending axially through the annular wall 30 is a reduced diameter end portion 32 of a bushing 34 into which a distal end portion of rotatable shaft 12 is axially inserted. The end portion 32 of bushing 34 is provided with a circumferential groove 36 from which a split retaining ring 38 radially protrudes. Ring 38 bears against the exterior end surface of race 28 and retains the bushing 34 rotatably in the race 28.

The annular wall 30 of race 28 extends radially outward of the reduced diameter end portion 32 of bushing 34, and has an outer peripheral portion attached to one end of a right cylindrical wall 40 of the race. Wall 40 extends axially of the assembly and has an opposing end comprising a circular rim which defines an open end of race 28. The wall 40 is disposed in spaced encircling relationship with an intermediate diameter portion 42 of bushing 34. The intermediate diameter portion 42 is joined at one end to the reduced diameter end portion 32 and at the other end to a larger diameter, flanged portion 44 of bushing 34. Flanged portion 44 extends radially over the annular space between intermediate diameter portion 42 and the cylindrical wall 40 to overlie the circular rim of race 28, thereby closing the open end of the race. The flanged portion 44 is joined to a smaller diameter end portion 46 of bushing 34 which terminates adjacent a closed end of a cup-shaped knob shell 48 enclosing the assembly.

Figure 2:
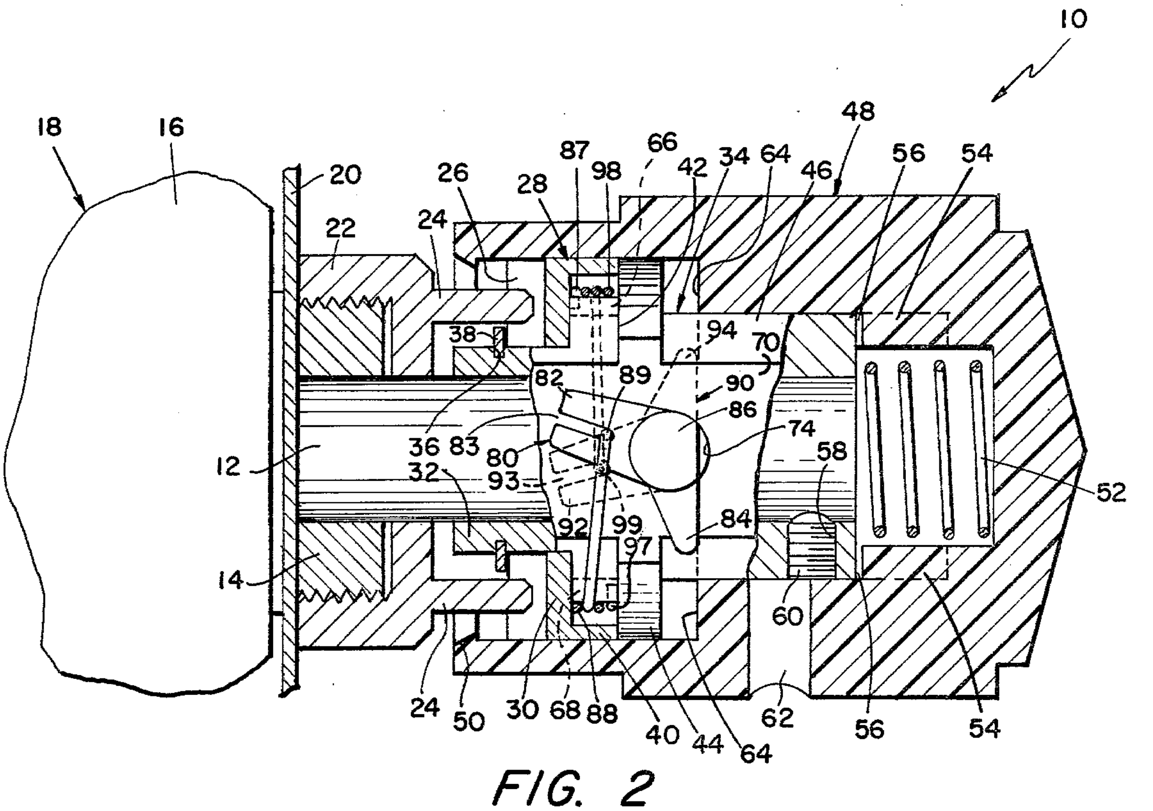
FIG. 2 is an axial view, partly in section, of the control knob assembly shown in FIG. 1, but in the unlocked operating condition.

Knob shell 48 has an axially extending, cylindrical wall which terminates adjacent the open end of the shell in an inwardly extending annular lip 50. The knob shell 48, preferably, is made of flexible plastic material, such as polycarbonate, for example, which permits snapping the annular lip 50 over the race 28 to support the shell for rotation about the race. The lip 50 may be held resiliently against the exterior end surface of race 28 by a compressibly operated, coil spring 52 having one end bearing against the closed end of shell 48 and an opposing end pressing against the adjacent end surface of bushing 34. The coil spring 52 is axially disposed between a pair of diametrically spaced keys 54 which protrude from the closed end portion of knob shell 48. The keys 54 are resiliently positioned by the spring 52 in the entrance portions of respectively aligned slots 56 which are diametrically disposed in the adjacent end portion of bushing 34. Initially, the keys 54 only partly engage the aligned slots 56 to maintain alignment with the slots and permit axial movement of knob shell 48 against the resilient pressure of compressible spring 52, whereby the keys 54 more fully engage the aligned slots 56, as shown in FIG. 2. Accordingly, the keys 54 and the slots 56 comprise respective interlocking means for rotatably connecting the knob shell 48 to the bushing 34.

Extending radially through the wall of bushing end portion 46 is a threaded aperture 58 having therein a fastening means, such as set screw 60, for example. The set screw 60 is journalled entirely into the aperture 58 and into binding engagement with the rotatable shaft 12. Thus, the set screw 60 rotatably connects the shaft 12 to the bushing 34 which, as previously described, is rotatably connected through interlocking means to the knob shell 48. Radially aligned with the threaded aperture 58 is an aperture 62 which extends entirely through the cylindrical wall of knob shell 48 to provide access means for inserting a suitable tool (not shown) to rotatably engage the set screw 60. In this manner, the entire knob assembly 10 may be installed or removed, as a unit, from the distal end portion of rotatable shaft 12. Extending radially inward from the cylindrical wall of knob shell 48 is an annular shoulder 64 which is axially spaced from the flanged portion 44 of bushing 34 by the compressibly operated, coil spring 52 bearing against the closed end of knob shell 48.

The intermediate diameter portion 42 of bushing 34 has longitudinally disposed in the outer cylindrical surface thereof a pair of diametrically spaced slots, 66 and 68, respectively, which preferably extend the entire length of the intermediate diameter portion. Orthogonally disposed with respect to the slots 66 and 68 is a pair of diametrically spaced surface portions 70 and 72, respectively, which are flatted, as by machining, for example. The flatted surface portions 70 and 72 are disposed longitudinally of bushing 30 and may extend from the reduced diameter end portion 32 to the distal end of the bushing. Thus, the flatted surface portions 70 and 72 extend longitudinally into the race 28 and, as shown more clearly in FIG. 4, are disposed chordally with respect to the encircling wall of knob shell 48. Centrally disposed between their longitudinal edges, the flatted surface portions 70 and 72 are provided with respective radially extending apertures 74 and 76 which are axially spaced a predetermined distance from the annular shoulder 64 of knob shell 48. The apertures 74 and 76 may conveniently comprise respective opposing end portions of a bore extending diametrically through the bushing 34.

A pivotal arm 80 having respective angled end portions 82 and 84 extending radially from a cylindrical fulcrum 86 is rotatably mounted on the flatted surface portion 70 by having an inner trunion end portion of the fulcrum rotatably disposed in the aperture 74. Also, a pivotal arm 90 having respective angled end portions 92 and 94 extending radially from a cylindrical fulcrum 96 is rotatably mounted on the flatted surface portion 72 by having an inner trunion end portion of the fulcrum rotatably disposed in the aperture 76. The arms 80 and 90 are retained rotatably in the respective apertures 74 and 76 by outer cylindrical end surfaces of the fulcrums 86 and 96, respectively, being disposed in chordally contacting relationship with the encircling wall portion of knob shell 48. Alternatively, the arms 80 and 90 may comprise substantially flat members having similar configurations, as provided by stamping, for example, and may be rotatably mounted by having respective headed axle pins passed through the fulcrum thereof and into engagement with aligned surface portions of the bushing 34. The arms 80 and 90 initially are mounted in the respective apertures 74 and 76 such that their end portions 82 and 92, respectively, extend axially along the adjacent flatted surfaces of bushing 30 and into the race 28. Also, the other end portions 84 and 94 of the respective arms 70 and 80 extend transversely, in respective opposing directions, of the adjacent flatted surface portions of bushing 30 and angularly with respect to the axial centerline thereof, to abut respective chordally disposed portions of the annular shoulder 64 of knob shell 48.

Retained in the race 28 by the overlying flanged portion 44 of bushing 34 is an axially aligned pair of oppositely wound coil springs, 88 and 98, respectively, which encircle the intermediate diameter portion 42 of the bushing. The springs 88 and 98, preferably, have respective outer diameters slightly larger, such as five-thousandths, for example, than the inner diameter of cylindrical wall 40 such that outer peripheral surface portions of the springs exert an initial radial pressure against the inner surface of wall 40. Spring 88 has a radially directed end portion 87 disposed adjacent the wall 30 of race 28 and engaged in the slot 66. As viewed from wall 30, the spring 88 is wound a suitable number of turns, such as one and three quarters for example, in the counterclockwise direction and toward a central transverse plane of intermediate diameter portion 32. In contrast, spring 98 has a radially directed end portion 97 disposed adjacent the flanged portion 44 of bushing 34, and engaged in the slot 68. As viewed from flanged portion 44, the spring 98 is wound a suitable number of turns, such as one and three quarters, for example, in the clockwise direction and toward the central transverse plane of intermediate diameter portion 42. The springs 88 and 98 terminate at their other ends in respective radially directed end portions 89 and 99, which are diametrically spaced apart, preferably in approximately the same transverse plane, and are disposed adjacent the arm end portions 82 and 92, respectively. The end portion 89 of spring 88 is suitably engaged in the arm end portion 82, as by protruding into an open-ended slot 83 provided in the end portion 82, for example. Similarly, the end portion 99 of spring 98 is suitably engaged in the arm end portion 92, as by protruding into an open-ended slot 93 provided in the end portion 92, for example.

Thus, when a rotational force is applied to the knob shell 48, without applying an axially directed pressure thereto, the force is transmitted to the bushing 34 and causes one of the springs 80 and 90, respectively, to tend to open radially outward thereby increasing the radially directed pressure on cylindrical wall 40 of race 28. As a result, the bushing 34 and engaged shaft 12 is locked non-rotatably in their initial angular positions. However, as shown in FIG. 2, when an axially directed pressure is exerted on the knob shell 48, the annular shoulder 64 thereof moves axially against the abutting end portions 84 and 94, respectively, to rotate the associated arms in opposite angular directions. Consequently, the arm end portions 82 and 92 rotate correspondingly to wind the oppositely wound springs 88 and 98, respectively, around the intermediate portion 42 of bushing 34. Accordingly, the springs 88 and 98 are windingly removed from binding engagement with the cylindrical wall 40 of non-rotatable race 28, thereby permitting the bushing 34, attached shaft 12, and the fully engaged knob shell 48 to rotate as a unit in response to corresponding rotation of the knob shell.

When the rotatable shaft reaches a selected angular position for achieving the desired adjustment of control device 18, the axial pressure is removed from the knob shell 48. As a result, the compressed coil spring 52 resiliently re-positions the keys 54 in the entrance portions of the aligned slots 56, and removes the pressure of annular shoulder 64 from the end portions 84 and 94 of the arms 80 and 90, respectively. Consequently, the resilient force of springs 88 and 98 acting on the end portions 82 and 92, respectively, causes the associated arms 80 and 90 to rotate back to their initial positions. Accordingly, the end portions 84 and 94 of the respective arms again are disposed in abutting engagement with the annular shoulder 64 of knob shell 48; and the springs 88 and 98 are unwound from the intermediate portion 42 of bushing 34 to exert a radial pressure on the cylindrical wall 40 fo race 28. Thus, the bushing 34 and engaged shaft 12 are locked in the newly selected angular position by the windingly operated spring means comprising the axially aligned pair of oppositely wound coil springs, 88 and 98, respectively, disposed arcuately in the annular race 28.

Accordingly, the annular shoulder 64 of knob shell 48 and the oppositely pivotal arms 80 and 90, respectively, constitute a release means for disengaging the oppositely wound springs 88 and 99, respectively, from binding engagement with the cylindrical wall 40 of race 28 in response to an axial force applied to the knob shell, thereby permitting simultaneous rotation of the knob shell 48, bushing 34, and shaft 12 to respective newly selected angular positions.

Thus, it may be seen that all of the objectives of this invention have been achieved by the knob assembly disclosed herein. However, it also will be apparent that various changes may be made by those skilled in the art without departing from the spirit of the invention as expressed in the appended claims. It is to be understood, therefore, that all matter shown and descrived herein is to be interpreted in an illustrative rather than in a limiting sense.

What is claimed is:

1. A control knob assembly for mounting on an end portion of a rotatable shaft and comprising:

a bushing rotatably disposed to encircle the end portion of the shaft and having first interlocking means for transmitting rotary motion to the shaft;

a non-rotatable race disposed adjacent an end portion of the bushing, the race including an annular end wall extended outwardly of the bushing end portion and an attached outer cylindrical wall disposed in spaced encircling relationship with the bushing end portion;

windingly operated spring means annularly disposed between the bushing end portion and the cylindrical wall of the race for exerting radial pressure and releaseably locking the bushing to the non-rotatable race to prevent rotation of the bushing in either angular direction, the windingly operated spring means including an axially aligned pair of oppositely wound coil springs having respective portions disposed for engagement with the bushing end portion;

a knob shell supported rotatably about the bushing and having second interlocking means for transmitting rotary motion thereto;

release means axially aligned with a portion of the knob shell and disposed in engagement with the windingly operated spring means for controllably unlocking the bushing from the nonrotatable race in response to an axial force applied to the shell; and axially operated spring means disposed between the knob shell and the bushing for resiliently positioning the shell with respect to the bushing.

2. A control knob assembly as set forth in claim 1 wherein the oppositely wound springs have respective terminal end portions secured to the end portion of the bushing, and respective peripheral surface portions disposed for pressure engagement with the outer cylindrical wall of the race.

3. A control knob assembly as set forth in claim 1 wherein the bushing includes a flanged portion overlying the oppositely wound coil springs.

4. A control knob assembly as set forth in claim 2 wherein the knob shell has an inwardly extended portion axially spaced from the race.

5. A control knob assembly as set forth in claim 4 wherein the release means comprises an angularly spaced pair of oppositely pivotal arms rotatably mounted on the bushing and having end portions disposed for engagement with respective other end portions of the oppositely wound springs.

6. A control knob assembly as set forth in claim 5 wherein the pivotal arms have other end portions extended transversely, in respective opposite directions, relative to the knob shell and have portions aligned with the inwardly extended portions of the knob shell.

7. A control knob assembly as set forth in claim 6 wherein the inwardly extended portion of the knob shell comprises a radial shoulder disposed for pressure engagement with the transversely extended end portions of the oppositely pivotal arms.

8. A control knob assembly as set forth in claim 7 wherein the axially operated spring means includes a compressibly operated coil spring having respective ends disposed in pressure engagement with the knob shell and the bushing.

* * * * *

UNITED STATES PATENT OFFICE
CERTIFICATE OF CORRECTION

Patent No. 4,201,096 Dated May 6, 1980

Inventor(s) Raymond C. Morrison and Albert R. Pratt

It is certified that error appears in the above-identified patent and that said Letters Patent are hereby corrected as shown below:

Column 1, line 8, change "controllablyy" to --controllably--.

line 67, change "and" to --the--.

Signed and Sealed this

*Eighteenth* Day of *August 1981*

[SEAL]

*Attest:*

GERALD J. MOSSINGHOFF

*Attesting Officer* *Commissioner of Patents and Trademarks*